US009666955B2

(12) United States Patent
Sugino (10) Patent No.: US 9,666,955 B2
(45) Date of Patent: May 30, 2017

(54) CONDUCTIVE LINE AND ROUTING STRUCTURE FOR THE SAME

(71) Applicant: SUMITOMO WIRING SYSTEMS, LTD., Yokkaichi-shi, Mie (JP)

(72) Inventor: Hidetoshi Sugino, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/838,916

(22) Filed: Aug. 28, 2015

(65) Prior Publication Data

US 2016/0071630 A1 Mar. 10, 2016

(30) Foreign Application Priority Data

Sep. 5, 2014 (JP) .................................. 2014-180850

(51) Int. Cl.
| | | |
|---|---|---|
| H01R 4/00 | (2006.01) | |
| H01R 4/02 | (2006.01) | |
| H02G 15/18 | (2006.01) | |
| H01R 12/63 | (2011.01) | |
| B60R 16/02 | (2006.01) | |
| H01R 43/02 | (2006.01) | |
| H01R 4/72 | (2006.01) | |
| H01R 43/28 | (2006.01) | |

(52) U.S. Cl.
CPC ......... *H01R 4/021* (2013.01); *B60R 16/0215* (2013.01); *H01R 12/63* (2013.01); *H02G 15/1806* (2013.01); *H01R 4/72* (2013.01); *H01R 43/02* (2013.01); *H01R 43/28* (2013.01); *H01R 2201/26* (2013.01)

(58) Field of Classification Search
CPC .. B60R 16/0215; H05K 9/007; H05K 9/0098; H01B 7/0009; H02G 3/0462; H02G 15/1806; H01R 4/72; H01R 4/723; H01R 4/726; H01R 4/187; H01R 4/021; H01R 4/625; H01R 43/0207
USPC .............................. 174/72 A, 68.1; 439/874
See application file for complete search history.

(56) References Cited

U.S. PATENT DOCUMENTS 4,590,329 A * 5/1986 Potochnik .............. H01R 13/59
                                                            174/76
6,376,773 B1 * 4/2002 Maegawa .............. H01R 12/63
                                                            174/117 F (Continued)

FOREIGN PATENT DOCUMENTS

JP        2011-173456 A        9/2011

*Primary Examiner* — Dimary Lopez Cruz
(74) *Attorney, Agent, or Firm* — Oliff PLC (57) ABSTRACT

A connection portion between a single-core line electrical line and a stranded electrical line is prevented from bulging in the diameter direction. A conductor exposed portion is formed on an end portion of the single-core line electrical line, and an individual wire exposed portion is formed on an end portion of the stranded electrical line. A collapsed portion is formed on the conductor exposed portion, and a connection block portion is formed by welding together individual wires of the individual wire exposed portion. The compressed portion and the connection block portion are joined in an overlapping state. At this time, the collapsed portion is bent such that a level difference is formed in the diameter direction such that the single-core line electrical line and the stranded electrical line are joined approximately coaxially.

5 Claims, 7 Drawing Sheets

(56) References Cited

U.S. PATENT DOCUMENTS

| | | | |
|---|---|---|---|
| 8,931,685 B2* | 1/2015 | Kataoka | H01R 4/021 228/110.1 |
| 8,936,187 B2* | 1/2015 | Hino | H01R 43/02 228/112.1 |
| 2006/0121773 A1* | 6/2006 | Ichikawa | H01R 4/70 439/408 |

* cited by examiner

PRIOR ART

Fig. 7

CONDUCTIVE LINE AND ROUTING STRUCTURE FOR THE SAME

TECHNICAL FIELD

The present invention relates to a conductive line and a routing structure.

BACKGROUND ART

Batteries in hybrid vehicles or electric vehicles are connected to motors (inverters) via a conductive line. Conductive line routing structures such as that of JP 2011-173456A are known. In the disclosed routing structure, a battery that is provided in the rear side of the vehicle is connected to an inverter provided inside the engine room via multiple electrical lines. A metallic shield pipe is arranged underneath the vehicle, and conductive lines are inserted into this shield pipe. The shield pipe is bent into a shape that follows a predetermined routing path, and the front end side is introduced into the engine room and extends to the vicinity of the inverter. The routing path between the shield pipe and inverter is relatively short, and because the task of connection becomes difficult if the shield pipe cannot be freely bent, a metallic braided portion that is made up of individual metal wires braided into a tubular shape is connected to the front end side of the shield pipe so that bending can be easily performed. Similarly, the conductive lines inside the metal braided portion are also required to follow the bending of the metal braided portion, and therefore it has been regular practice to use stranded electrical lines that have superior flexibility, for the conductive lines that connect the battery to the motor (inverter) for the entirety of the routing path.

Incidentally, the diameter of the shield pipe depends on the outer diameter of the conductive lines to be inserted into the shield pipe, but as it is difficult to achieve a smaller diameter with stranded electrical lines, the changing over to single-core lines, whose diameter is easily reduced, has recently been considered in the portion to be inserted into the shield pipe. However, free bending of the electrical lines is required in the portion outside of the shield pipe as described above, but this requirement cannot be easily met with a single-core line electrical line. For this reason, stranded electrical lines need to be used in the portion outside of the shield pipe. If that is the case, single-core line electrical lines will be connected to stranded electrical lines at the exit portion of the shield pipe. Also, a heat shrinking tube needs to be placed over the junction portion between two electrical lines in order to avoid short circuiting between the electrical lines.

JP 2011-173456A is an example of related art.

SUMMARY

Incidentally, if a single-core line electrical line is to be connected to a stranded electrical line, there is a need to strip sheathings from their end portions, so as to expose the conductor within the single-core line electrical line and the individual wires within the stranded electrical line. Also, if the efficiency of the connection task and connection reliability are to be ensured, it is preferable that the conductor is collapsed flat, and the individual wires are welded to form a block.

Figure 7:
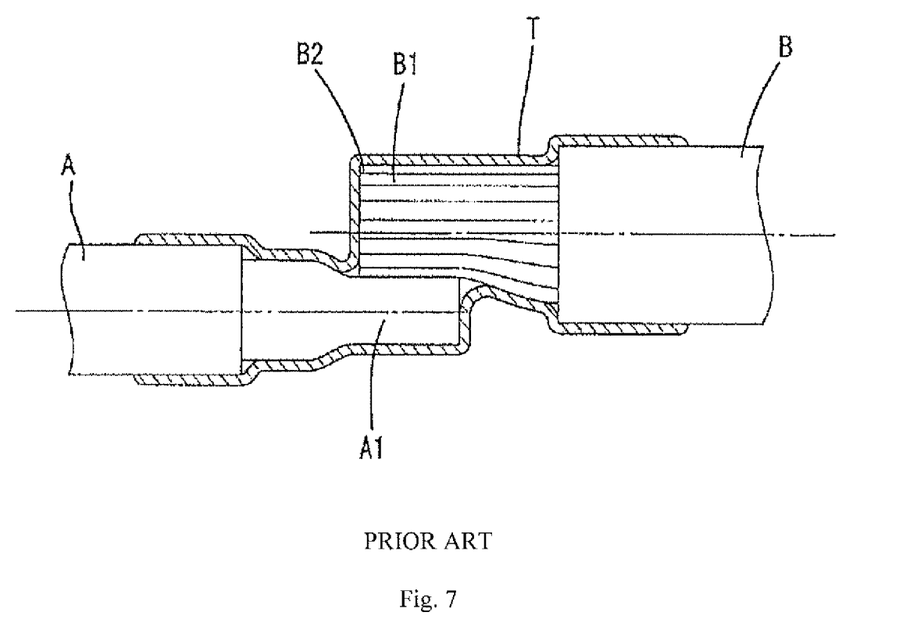
FIG. 7 is a side cross-sectional view showing issues in conventional art.

However, when connecting the two electrical lines, if a junction portion B1 of a stranded electrical line B is mounted on top of and welded to a junction portion A1 of a single-core line electrical line A, the central axes of the electrical lines A and B will be shifted in the diameter direction. Thus, with respect to the diameter direction, the junction portion B1 on the stranded electrical line B side will protrude more outward in the diameter direction than the single-core line electrical line A. Because the individual wires are welded together in advance and made into a block in the junction portion B1 of the stranded electrical line B, such as in the above description, there is a concern that a corner portion B2 of this portion will pierce and protrude through a heat shrink tube T if it excessively interferes with the heat shrink tube T. Also, in the case where insertion into the shield pipe is performed after performing the task of connecting the stranded electrical line and the single-core line electrical line as the conductive line routing task, if the junction portion between the stranded electrical line and the single-core electrical line bulges to a large degree in the diameter direction, the junction portion will be likely to interfere with the shield pipe, and will pierce and protrude from the heat shrink tube due to insertion workability or "collision" with a pipe end portion. Also, there is the concern of hindering the reduction of the diameter of the shield pipe.

The preferred embodiments have been achieved in light of the above-described circumstances, and an object thereof is to, in a conductive line constituted by connecting a single-core line electrical line to a stranded electrical line, prevent the bulging of the junction portion between the two electrical lines, with respect to the diameter direction, as much as possible.

A conductive line according to a preferred embodiment includes: a stranded electrical line made up of a plurality of twisted individual wires that are enveloped in a sheathing; and a single-core line electrical line made up of a single conductor that is enveloped in a sheathing, wherein the stranded electrical line is connected to at least one end portion out of two end portions of the single-core line electrical line in a length direction, and in a junction portion between the single-core line electrical line and the stranded electrical line, the sheathings of the single-core line electrical line and the stranded electrical line are stripped to expose the individual wires or the conductor, an individual wire exposed portion and a conductor exposed portion are joined by welding, and the single-core line electrical line and the stranded electrical line are approximately coaxial in this connection state.

Also, a conductive line routing structure according to the present embodiment uses the above-described conductive line, and includes: a shield pipe that is to be arranged underneath a hybrid vehicle or an electric vehicle and receives insertion of the single-core line electrical line, wherein the single-core line electrical line is connected to the stranded electrical line in a state in which at least a portion of the single-core line electrical line protrudes from the shield pipe, and a heat shrink tube is placed over a portion in which the stranded electrical line and the single-core line electrical line are connected.

If the conductive line such as the one described above is applied to a hybrid vehicle or electric vehicle, the following effects can be obtained. Because the shield pipe arranged underneath the vehicle has a small bending extent and has been bent to follow the predetermined routing path, single-core line electrical lines that do not have particularly high bendability can be sufficiently utilized. Also, the reduction of the diameter is easier with single-core lines than with stranded electrical lines. Accordingly, by contributing to the reduction of the diameter of the shield pipe, the optimization of the installation space and weight reduction can be achieved.

Also, the junction portion between the stranded electrical line and the single-core line electrical line is inserted into and protected by the heat shrink tube. In this case, excessive interference with the heat shrink tube by the junction portion between the two electrical lines can also be avoided.

According to the present embodiment, because the stranded electrical line and the single-core line electrical line are connected in a state in which their central axes are substantially aligned, there is no bulging of the junction portion between the two electrical lines with respect to the diameter direction, compared to the case where the two electrical lines are connected in a state in which their central axes are shifted in the diameter direction.

EMBODIMENTS

The following describes preferable embodiments of the present invention.
(1) It is preferable that in the conductive line of the present embodiment, along with a facing surface of the conductor exposed portion that faces the individual wire exposed portion being collapsed to form a collapsed portion, the collapsed portion is bent such that a level difference with a general portion is formed in a diameter direction of the conductor, the individual wire exposed portion overlaps and is connected to the compressed portion in the diameter direction, and a surface of the collapsed portion that is on an opposite side to a surface overlapped by the individual wire exposed portion is at approximately the same position as an outer surface of the sheathing of the single-core line electrical line with respect to the diameter direction, or at a position inward of the outer surface of the sheathing of the single-core line electrical line.

According to this configuration, the conductor exposed portion does not bulge outward from the sheathing of the single-core line electrical line in the diameter direction, and therefore it is possible to avoid bulging of the connection portion on the single-core line electrical line side.
(2) Also, a connection block portion in which the individual wires are welded together and connected to the collapsed portion may be formed in a tip portion of the individual wire exposed portion, and the connection block portion may be at a position within a range of a sheathing outer diameter of the stranded electrical line with respect to the diameter direction.

According to this configuration, the connection block portion formed in the individual wire exposed portion is at a position that is within the range of a sheathing outer diameter of the stranded electrical line with respect to the diameter direction, and therefore it is possible to avoid bulging of the connection portion on the stranded electrical line side.
(3) When a connection portion between the individual wire exposed portion and the conductor exposed portion is viewed in an overlapping direction, the connection portion may be at a position that is, with respect to a width direction that is a direction orthogonal to the overlapping direction, within a range of a smaller sheathing outer diameter out of sheathing outer diameters of the stranded electrical line and the single-core line electrical line.

According to this configuration, it is possible to prevent the connection portion between the individual wire exposed portion and the conductor exposed portion from bulging out from either the stranded electrical line or the single-core line electrical line in the width direction (which is also the diameter direction).
(4) The collapsed portion may be formed to one side in a state not including a central axis of the single-core line electrical line.

According to this configuration, a large level difference can be obtained with the compressed portion, and therefore the alignment of the central axes of the single-core line electrical line and the stranded electrical line can be easily performed.

The following is a description of first to third embodiments of a conductive line and a conductive line routing structure of the present embodiment with reference to the drawings.

First Embodiment

Figure 4:
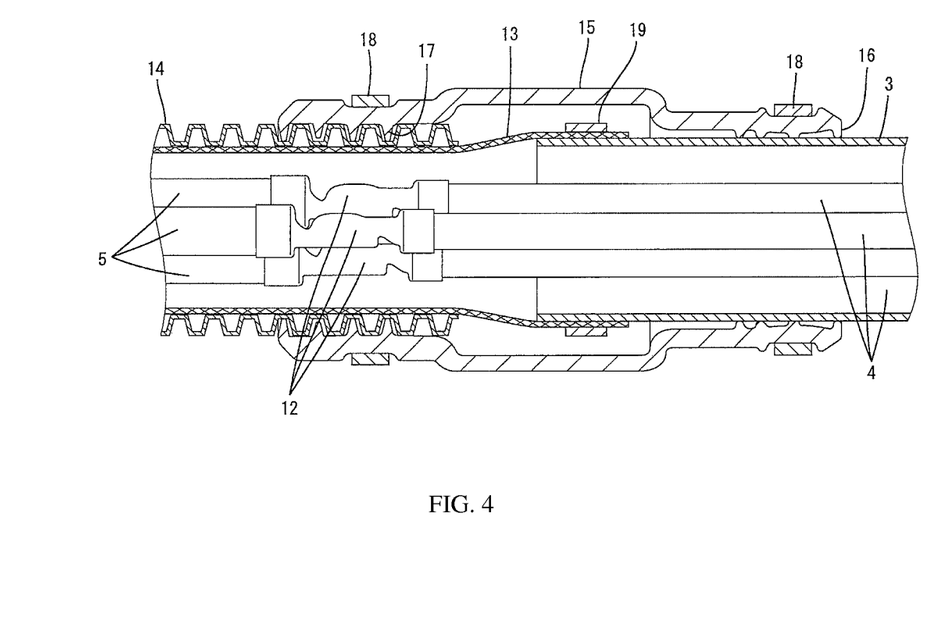
FIG. 4 is a cross-sectional view showing a situation in which conductive lines have been inserted into a shield pipe, a metallic braided portion, and a corrugated tube.

A conductive line according to the present embodiment is applied to a hybrid vehicle. A battery 1, which has been mounted in the rear side of a vehicle, is connected to an inverter 2, which has been provided inside an engine room, via a wire harness WH. As shown in FIG. 4, in the case of the present embodiment, the wire harness WH is constituted by three conductive lines L.

The wire harness WH is collectively inserted into a shield pipe 3 that has been arranged underneath the vehicle. More specifically, the rear end side of the shield pipe 3 is introduced to the rear side of the cabin, and a metallic braided portion 13 (to be described later) is interposed between the battery 1 and the shield pipe 3. An intermediate portion of the shield pipe 3 extends in an approximately horizontal fashion along the front-rear direction underneath the vehicle. The front end side bends upwards and is introduced to the engine room, and extends out toward the inverter 2.

The shield pipe 3 is made of aluminum or an aluminum alloy, and is configured by an elongated pipe having a circular cross-section. The shield pipe 3 is bent into a shape that follows a predetermined piping route.

Figure 2:
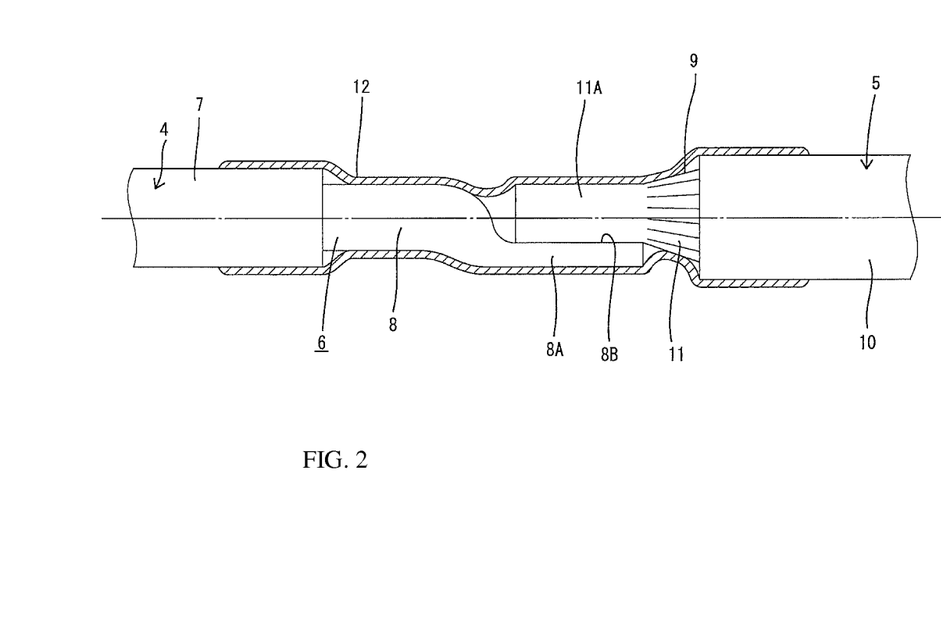
FIG. 2 is a side cross-sectional view showing a junction portion between a stranded electrical line and a single-core line electrical line.
Figure 3:
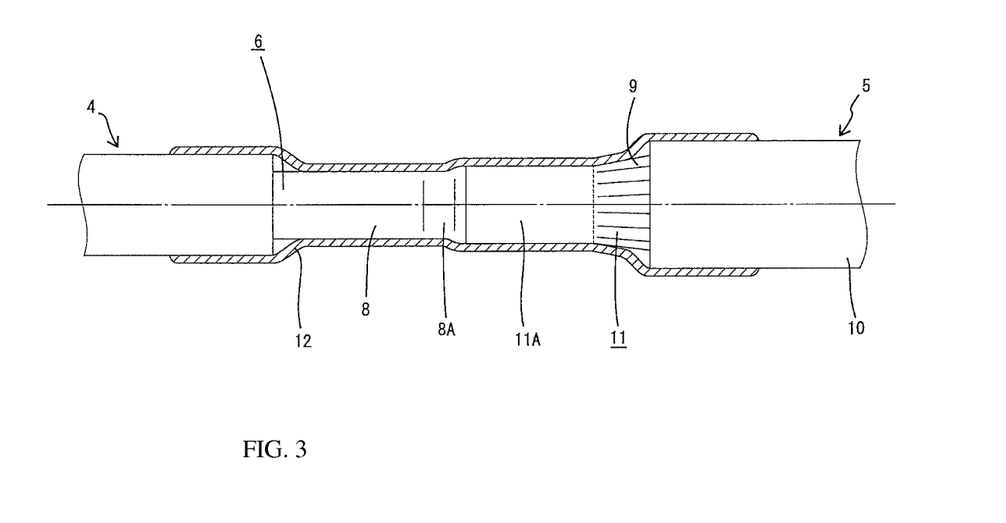
FIG. 3 is a plan cross-sectional view of the same.

As shown in FIG. 2, each conductive line L is constituted by a single-core line electrical line 4 and a stranded electrical line 5 that are connected in the length direction. The single-core line electrical line 4 is constituted by a single conductor 6 and an enveloping sheathing 7 that is made of an insulating material. In the case of the present embodiment, the conductor 6 is made of aluminum or an aluminum alloy and is formed so as to have a circular cross-section. By stripping the sheathing 7 from the front end side of the single-core line electrical lines 4 over a predetermined length range, a conductor exposed portion 8 with an exposed conductor 6 is formed. Approximately half of the tip side of this conductor exposed portion 8 is collapsed into a flat plate shape that becomes a collapsed portion 8A. This collapsed portion 8A is bent such that a level difference with a general portion is formed in the diameter direction of the conductor 6. In FIG. 2, after having been bent so as to be shifted downward from the central axis of the conductor 6, the collapsed portion 8 extends parallel along the axis line to the tip portion. A connection surface 8B of the collapsed portion 8A for connection to the stranded electrical line 5 is a flat surface that is parallel to the axis line. In the first embodiment, the collapsed portion 8A is formed to one side in a state not including the central axis of the single-core line electrical line 4. As shown in FIG. 3, the collapsed portion 8A is formed with approximately the same width as the diameter of the general portion. Accordingly, the collapsed portion 8A is formed so as to extend only toward the tip side during collapsing.

Note that methods such as the following are conceivable formation methods for the collapsed portion 8A. Specifically, a single-core line electrical line 4 is set in advance in a clamping jig that extends over the range from the sheathing portion of the single-core line electrical line 4 to the tip of the conductor exposed portion 8. A pair of restricting walls have been formed on the clamping jig so that the conductor exposed portion 8 is sandwiched in the width direction. Then, a flattening jig is lowered from above the conductor exposed portion 8 along the diameter direction, and the tip side of the conductor exposed portion 8 is restricted from stretching in the width direction as it is flattened against the clamping jig, and this is one conceivable method.

A surface of the collapsed portion 8A that is on the opposite side of the connection surface 8B for connection to the stranded electrical line 5 is at approximately as the same position as or inward of the sheathing 7 of the single-core line electrical line 4 with respect to the diameter direction. In other words, the collapsed portion 8A is positioned inward of an extension line of the outer surface of the sheathing 7 of the single-core line electrical line 4, and is set so as not to protrude outward of the extension line.

On the other hand, the stranded electrical line 5 has a core line that is made up of a plurality of individual wires 9, which are enveloped in a sheathing 10 that is made of an insulating material, and the stranded electrical line 5 is formed with an overall diameter that is slightly larger than that of the single-core line electrical line 4. The individual wires 9 of the stranded electrical line 5 are formed with aluminum or an aluminum alloy. By stripping the sheathing 10 over a predetermined length range from each end, the individual wires 9 are exposed, and an individual wire exposed portion 11 is formed. A connection block portion 11A in which the individual wires 9 are welded together into a block with an approximately rectangular-parallelepiped shape, is formed on the tip side of the individual wire exposed portion 11. In both the side view of FIG. 2 and the plan view of FIG. 3, this connection block portion 11A extends coaxially with the general portion of the stranded electrical line 5.

As shown in FIG. 2, the connection block portion 11A is set such that the central axes of the single-core line electrical line 4 and the stranded electrical line 5 are approximately coaxial when the connection block portion 11A is superposed onto and connected to the collapsed portion 8A in the level difference direction. Specifically, as shown in FIG. 2, when the collapsed portion 8A and the connection block portion 11A are viewed from the side in the connected state, the central axis of the connection block portion 11A (which is also the central axis of the entire stranded electrical line 5) and the central axis of the conductor exposed portion 8 (which is also the central axis of the single-core line electrical line 4) are positioned so as to be approximately coaxial.

For the connection of the collapsed portion 8A and the connection block portion 11A, the dimension of the connection block portion 11A in the front-rear direction is set so as to be approximately the same as the dimension of the collapsed portion 8A in the front-rear direction. Also, as shown in FIG. 2, in the case where the collapsed portion 8A and the connection block portion 11A are viewed from the side in the connected state, the thickness dimension of the connection block portion 11A, which is the diameter direction, is set slightly larger than the thickness dimension of the collapsed portion 8A. Note that, in with the collapsed portion 8A and the connection block portion 11A in an overlapping state, the outer surface of the connection block portion 11A is at a position with approximately the same height as the outer surface of the general portion of the conductor exposed portion 8, with respect to the overlapping direction, or in other words, it is set so as to be inward of the sheathing 10 of the stranded electrical line 5 with respect to the diameter direction. Furthermore, as shown in FIG. 3, in the state in which the collapsed portion 8A of the single-core line electrical line 4 is connected to the connection block portion 11A, the connection block portion 11A has a width dimension that is slightly larger than that of the collapsed portion 8A (the dimension in the direction orthogonal to the level difference, the dimension in up-down direction in the drawing in FIG. 3), but is set to be within the range of the outer diameter of the sheathing 7 of the single-core line electrical line 4. In other words, the connection block portion 11A is set so as not to protrude outward in the diameter direction from the range of the outer diameter of the single-core line electrical line 4, which has an outer diameter smaller than that of the stranded electrical line 5.

Note that the collapsed portion 8A and the connection block portion 11A are to be connected outside of the shield pipe 3 using an ultrasonic joining machine or the like. Inter-metal joining at the contact site between the connection block portion 11A and the collapsed portion 8A is performed by this ultrasonic welding, and due to this connected state, an electric connection between the two can be obtained.

As shown in FIG. 4, in the state in which the conductive lines L are inserted into the shield pipe 3, the junction portions between the single-core line electrical lines 4 and the stranded electrical lines 5 are positioned so as to protrude a predetermined distance outside of the exit of the shield pipe 3. Also, as shown in FIG. 2, the junction portion between the single-core line electrical line 4 and the stranded electrical line 5 is covered by a heat shrink tube 12. The heat shrink tube 12 is placed so that it spans between the sheathing 7 of the single-core line electrical line 4 and the sheathing 10 of the stranded electrical line 5, the conductive lines L are then inserted, and accordingly, electrical insulation between the conductive lines L is maintained. Also, the heat shrink tube 12 holds the outer circumferential surfaces of both the sheathing 7 of the single-core line electrical line 4 and the sheathing 10 of the stranded electrical line 5 in close contact in a shielded state.

Figure 1:
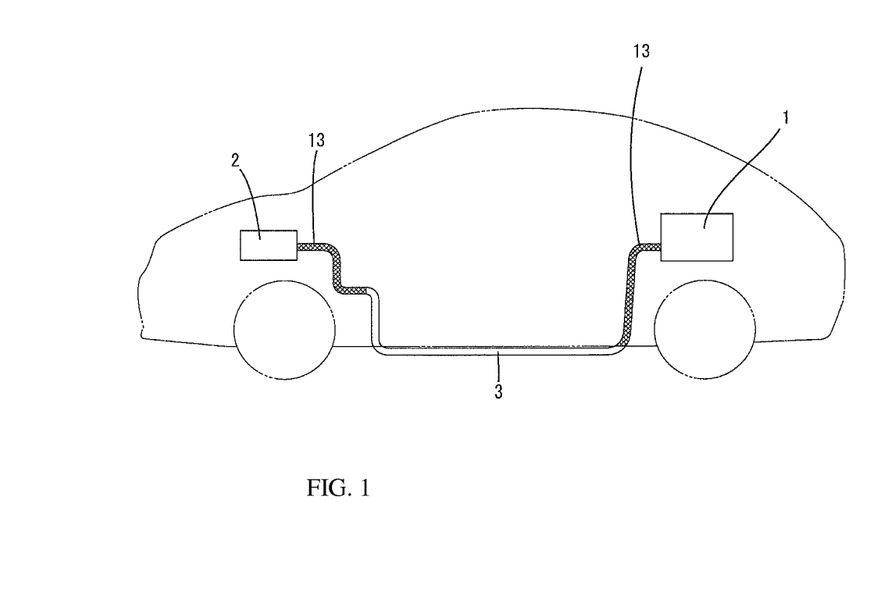
FIG. 1 is a schematic view showing a situation in which conductive lines are routed under a hybrid vehicle.

As shown in FIG. 1 and FIG. 4, an end portion the metallic braided portion 13 is connected to the front end portion of the shield pipe 3 by having a metallic swage ring 19 swaged around them. The metallic braided portion 13 is a made up of conductive metal individual wires that have been netted into a tubular shape, and has favorable bendability. By inserting the conductive lines L into the shield pipe 3 and the metallic braided portion 13, the conductive lines L are maintained in a shielded state over the entire routing path.

Furthermore, as shown in FIG. 4, the portion of the metallic braided portion 13 extending from the junction portion with the shield pipe 3 is inserted into and protected by a corrugated tube 14. The corrugated tube 14 is made of a synthetic resin, a bellows shape is formed by repeating ridge portions and valley portions, and the corrugated tube 14 has favorable flexibility. Also, a sealing grommet 15 has been placed over the corrugated tube 14 and the shield pipe 3. The grommet 15 is formed with a rubber material, both end portions are formed into tubular shapes, the tube portion on one end side can be mated to an outer circumferential portion of the shield pipe 3, and the tube portion formed on the other side can be mated to the outer circumferential portion of the corrugated tube 14. On the inner circumferential surface of the tube portion on the one end side, rows of seal lips 16 that follow and can come into close contact with the outer circumferential surface of the shield pipe 3 are formed along the entire circumference. Also, on the inner circumferential surface of the tube portion on the other end side, rows of seal edges 17 that enter the valley portions of the corrugated tube 14 and can come into close contact with the bottom surface of the valley portions are formed along the entire circumference. Furthermore, the outer circumferential surfaces of the two tubular portions are constricted by cable ties 18, thus connecting the shield pipe 3 and the corrugated tube 14 to the grommet 15.

Next is a description of actions and effects of the first embodiment as configured above. The routing section for the wire harness WH (conductive lines L) in the present embodiment can be separated into approximately two sections. The first section is a section in which the shield pipe 3 is arranged, and is a section in which the linear routing range is long and in which the bending extent even in a bending region is small. Conversely, the second section is an introduction region to either the inside of an engine room or the space at the rear side of a cabin, is the section in which mainly the metallic braided portion 13 that covers the stranded electrical line 5 is arranged, and is the section in which the bending extent of the bending portion is large.

According to the present embodiment, the single-core line electrical line 4, which has comparatively low bendability, is arranged inside the shield pipe 3 that is the first section. As described above, the first section has a long linear section, and because the bending extent even in the bending section is small, there are no cases in which excessive bending stress will be generated t even if he single-core line electrical lines 4 are applied to the first section. Also, in the case in which the single-core line electrical line 4 is compared with the stranded electrical line 5, if the cross-sectional area of the conductor 6 portion and the total cross-sectional area of all individual wires 9 are the same, the outer diameter of the single-core line electrical line 4 is smaller than the outer diameter of the stranded electrical line 5. Accordingly, the outer diameter of the shield pipe 3, which houses these electrical lines, can be reduced, and therefore efficiency in the space underneath a vehicle can be improved. Also, for the greater part of the routing range of the conductive lines L, single-core line electrical lines 4, which are inexpensive compared to the stranded electrical lines 5, can be used, thus contributing to the reduction of the overall cost of the conductive lines L.

Also, the second section is a section in which, the front end portion of the shield pipe 3 and the inverter 2 are connected inside a narrow engine room, or in which connection with the battery 1 in the rear side space in the cabin is performed. For this reason, the routing of the stranded electrical line 5 that have superior flexibility in this section makes for easy management of the electrical routing, which is favorable for connection tasks.

Results such as the following can be obtained, particularly in the present embodiment. Specifically, the stranded electrical line 5 and the single-core line electrical line 4 are connected in the state in which their central axes are approximately aligned with each other, and therefore the connection portion of the two electrical lines 4 and 5 in the diameter direction will not protrude in comparison to the case in which they are connected in the state in which the central axes shifted in the diameter direction. Accordingly, it is possible to avoid the situation in which the connection portion excessively interferes with and pierces through the heat shrink tube. In particular, in a case in which the individual wires 9 of the individual wire exposed portion 11 are welded into a block (connection block portion 11A), the corner portion can easily become an edge, and the danger of piercing through increases, but in the case of the first embodiment, past-processing such as rounding of the corner portions of the connection block portion 11A can be omitted, and such results can be obtained.

Also, even in the case of a task order in which the single-core line electrical line 4 and the stranded electrical line 5 are inserted the shield pipe 3 after they are connected, they are inserted into the shield pipe 3, and in cases in which this task order is followed the lack of bulging of the connection portions between the electrical lines 4 and 5 means that smooth insertion into the shield pipe 3 can be expected. Also, this simultaneously leads to a reduction of the diameter of the shield pipe 3.

Second Embodiment

Figure 5:
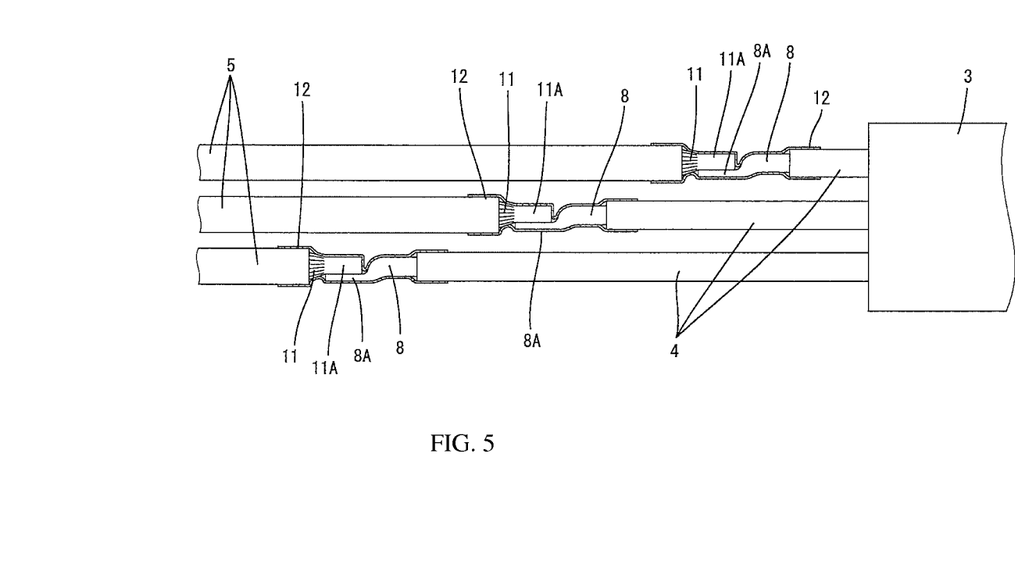
FIG. 5 is a side cross-sectional view showing junction portions between a stranded electrical line and a single-core line electrical line that are gradually shifted along the conductive line routing direction in conductive lines according to a second embodiment.

FIG. 5 shows a second embodiment of the present invention.

In the first embodiment, the junction portions between the single-core line electrical lines and the stranded electrical lines of the conductor lines L are at positions aligned with respect to the front-rear direction (see FIG. 4), but in the second embodiment, these junction portions are successively shifted the front-rear direction.

The connection of the single-core line electrical line 4 and the stranded electrical line 5 is performed after the single-core line electrical line 4 has been inserted into the shield pipe 3, and in cases of this task order, if the junction portion of the conductive line L were to be shifted front-end, interference between a welding machine and the conductive line L is easily avoided, and the welding task can be smoothly performed. Other configurations are similar to the above embodiment, and thus can exhibit similar effects.

Third Embodiment

Figure 6:
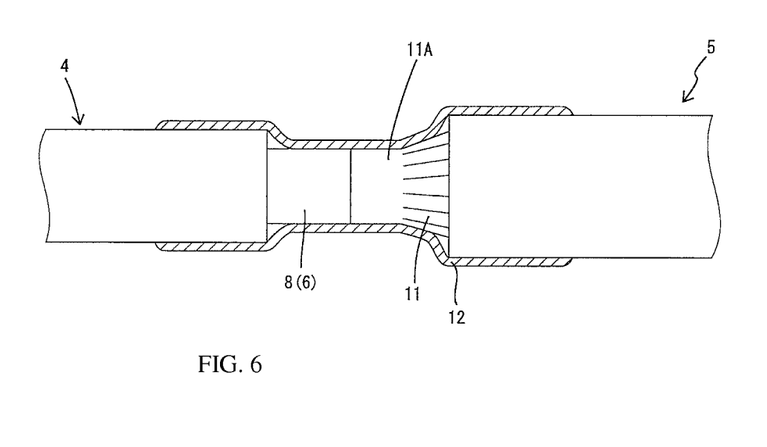
FIG. 6 is a side cross-sectional view showing a junction portion between a stranded electrical line and a single-core line electrical line in a conductive line according to a third embodiment.

FIG. 6 shows a third embodiment of the present invention.

In the first and second embodiment, the collapsed portion 8A and the connection block portion 11A are connected so as to overlap in the diameter direction, but in the third embodiment, end surfaces of the conductor exposed portion 8 and the individual wire exposed portion 11 are butted against each other coaxially, and the abutting end surfaces are fused together. In this case, the individual wires 9 in the tip portion of the individual wire exposed portion 11 are welded into a block, similarly to the connection block portion 11A.

In the third embodiment configured as described above, the junction portion does not bulge out from the general portion of the electrical line in the diameter direction, and therefore reduction of the diameter of the shield pipe 3, and excessive interference with the heat shrink tube 12 can be avoided.

Other configurations are similar to the first and second embodiments, and thus can similar actions and effects can be exhibited.

Other Embodiments

The present embodiment is not limited to the embodiments described using the above descriptions and diagrams, and embodiments such as the following also fall under the technical scope of the present embodiment.

(1) In the above embodiments, the conductive lines L are inserted into a shield member (shield pipe 3 and metallic braided member 13), but use on their own without including the shield means is also of course possible.

(2) In the first embodiment, the welding of the connection block portion 11A of the stranded electrical line 5 that connects the stranded electrical line 5 to the collapsed portion 8A of the single-core line electrical line 4 is performed with ultrasonic welding, but instead, methods such as resistance welding or soldering may be performed.

(3) In the above embodiments, both the conductor 6 of the single-core line electrical line 4 and the individual wires 9 of the stranded electrical line 5 are made of aluminum or an aluminum alloy, but both may be made of copper or a copper alloy. Also, a configuration is possible in which the single-core line electrical line 4 is made of copper or a copper alloy and the stranded electrical line 5 is made of aluminum or aluminum alloy, and furthermore, they may be in the opposite combination.

(4) In the above embodiments, a case is shown in which the conductor exposed portion 8 and the individual wire exposed portion 11 are covered by the heat shrink tube 12, but instead, methods such as a molding, hot melting or tape wrapping may be performed.

(5) In the above embodiments, a case is shown in which the connection surface 8B on the collapsed portion 8A is a flat surface that is parallel to the axis line, but a fine uneven shape such as a serration may be added to the connection surface 8B as a slip stopper during connection of the stranded electrical lines 5.

LIST OF REFERENCE NUMERALS

3 Shield pipe
4 Single-core line electrical line
5 Stranded electrical line
6 Conductor
7 Sheathing
8 Conductor exposed portion
8A Collapsed portion
11 Individual wire exposed portion
11A Connection block portion (block portion)
12 Heat shrink tube

What is claimed is:

1. A conductive line comprising:
a stranded electrical line made up of a plurality of twisted individual wires that are enveloped in a sheathing; and
a single-core line electrical line made up of a single conductor that is enveloped in a sheathing,
wherein the stranded electrical line is connected to at least one end portion out of two end portions of the single-core line electrical line in a length direction, and
in a junction portion between the single-core line electrical line and the stranded electrical line, the sheathings of the single-core line electrical line and the stranded electrical line are stripped to expose the individual wires of the stranded electrical line and the conductor of the single-core line electrical line, an individual wire exposed portion and a conductor exposed portion are joined by welding, and the single-core line electrical line and the stranded electrical line are approximately coaxial about a central axis in this connection state, wherein
a facing surface of the conductor exposed portion that faces the individual wire exposed portion is collapsed to form a collapsed portion, the collapsed portion being bent such that a level difference with a general portion is formed in a diameter direction of the conductor such that an axis of the collapsed portion is not aligned with the central axis, the individual wire exposed portion overlaps and is connected to the collapsed portion in the diameter direction, and a surface of the collapsed portion that is on an opposite side to a surface overlapped by the individual wire exposed portion is at approximately the same position as an outer surface of the sheathing of the single-core line electrical line with respect to the diameter direction, or at a position inward, with respect to the central axis, of an outer surface of the sheathing of the single-core line electrical line.

2. The conductive line according to claim 1, wherein a connection block portion in which the individual wires are welded together and connected to the collapsed portion is formed in a tip portion of the individual wire exposed portion, and the connection block portion is at a position within a range of a sheathing outer diameter of the stranded electrical line with respect to the diameter direction.

3. The conductive line according to claim 1, wherein the collapsed portion is formed to one side in a state not including a central axis of the single-core line electrical line.

4. A conductive line routing structure for the conductive line according to claim 3, comprising:
a shield pipe that is to be arranged underneath a hybrid vehicle or an electric vehicle and receives insertion of the single-core line electrical line,
wherein the single-core line electrical line is connected to the stranded electrical line in a state in which at least a portion of the single-core line electrical line protrudes from the shield pipe, and a heat shrink tube is placed over a portion in which the stranded electrical line and the single-core line electrical line are connected.

5. The conductive line according to claim 1, wherein the single-core line electrical line and the stranded electrical line are approximately coaxial at a portion adjacent to the individual wire exposed portion and the conductor exposed portion.

* * * * *